(12) United States Patent
Vatanen

(10) Patent No.: US 6,169,890 B1
(45) Date of Patent: *Jan. 2, 2001

(54) MOBILE TELEPHONE SYSTEM AND METHOD FOR CARRYING OUT FINANCIAL TRANSACTIONS USING A MOBILE TELEPHONE SYSTEM

(75) Inventor: Harri Tapani Vatanen, Helsinki (FI)

(73) Assignee: Sonera Smarttrust Oy, Helsinki (FI)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/436,328

(22) PCT Filed: Nov. 11, 1993

(86) PCT No.: PCT/FI93/00474

§ 371 Date: Oct. 12, 1995

§ 102(e) Date: Oct. 12, 1995

(87) PCT Pub. No.: WO94/11849

PCT Pub. Date: May 26, 1994

(30) Foreign Application Priority Data

Nov. 11, 1992 (FI) .......................................................... 925135
Nov. 11, 1993 (FI) .......................................................... 934995

(51) Int. Cl.[7] .................................................... H04Q 7/20
(52) U.S. Cl. .......................... 455/406; 455/411; 455/558; 379/357
(58) Field of Search ................................. 379/58, 59, 62, 379/114, 130, 144, 357; 455/33.1, 403, 406–409, 410, 411, 558; 235/380; 380/247, 248, 271

(56) References Cited

U.S. PATENT DOCUMENTS

| | | | |
|---|---|---|---|
| 4,965,821 | 10/1990 | Bishop, et al. | 379/91 |
| 5,144,649 | 9/1992 | Zicker, et al. | 379/59 |
| 5,153,919 | 10/1992 | Reeds, III et al. | 380/44 |
| 5,249,230 | 9/1993 | Mihm . | |

FOREIGN PATENT DOCUMENTS

| | | | | |
|---|---|---|---|---|
| 0 225 010 A1 | 6/1987 | (EP) | | G07F/7/10 |
| 0 261 030 A2 | 3/1988 | (EP) | | G06F/1/00 |
| 0 262 025 A2 | 3/1988 | (EP) | | G07F/7/10 |
| 0 440 515 A1 | 8/1991 | (EP) | | G07F/7/12 |
| 04817142A2 | * 4/1992 | (EP) . | | |
| 0 481 714 A2 | 4/1992 | (EP) | | H04Q/7/04 |
| 0 566 811 A1 | 10/1993 | (EP) | | G06F/1/00 |
| WO92/21110 | 11/1992 | (WO) | | G07F/7/08 |
| WO93/07697 | 4/1993 | (WO) | | G07F/7/08 |

* cited by examiner

*Primary Examiner*—Dwayne D. Bost
*Assistant Examiner*—Nay Maung
(74) *Attorney, Agent, or Firm*—Cohen, Pontanu, Lieberman & Pavane

(57) ABSTRACT

A method and apparatus for effecting user-initiated communications, such as payment transactions, between user-accessible data terminal equipment communicatingly linkable with a mobile telephone exchange and at least one service provider, wherein each user or subscriber has a service card that is uniquely associated with that system subscriber, preferably employs a dedicated network to which the mobile exchange is connected at one end of the network and the service provider is connected at another end. The user's identity is locally authenticated before a communications connection through the network is provided, and user access rights to particular services of the service provider are determined in a database at the service provider end of the network. The invention is particularly well suited to the use of a SIM-card in a GSM-network to provide secure communications in an environment demanding high data security.

9 Claims, 2 Drawing Sheets

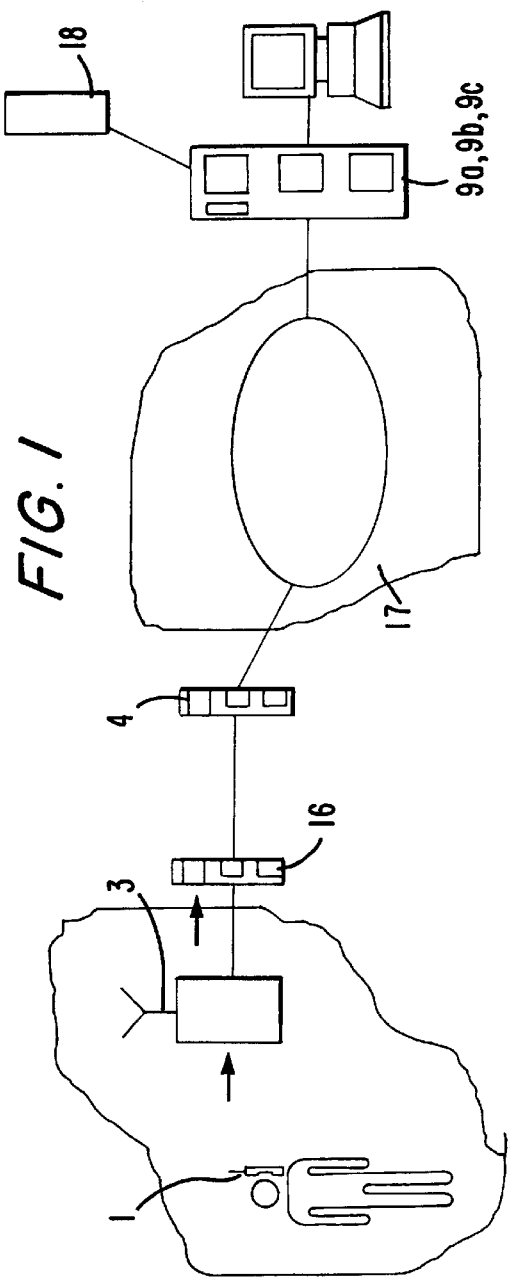
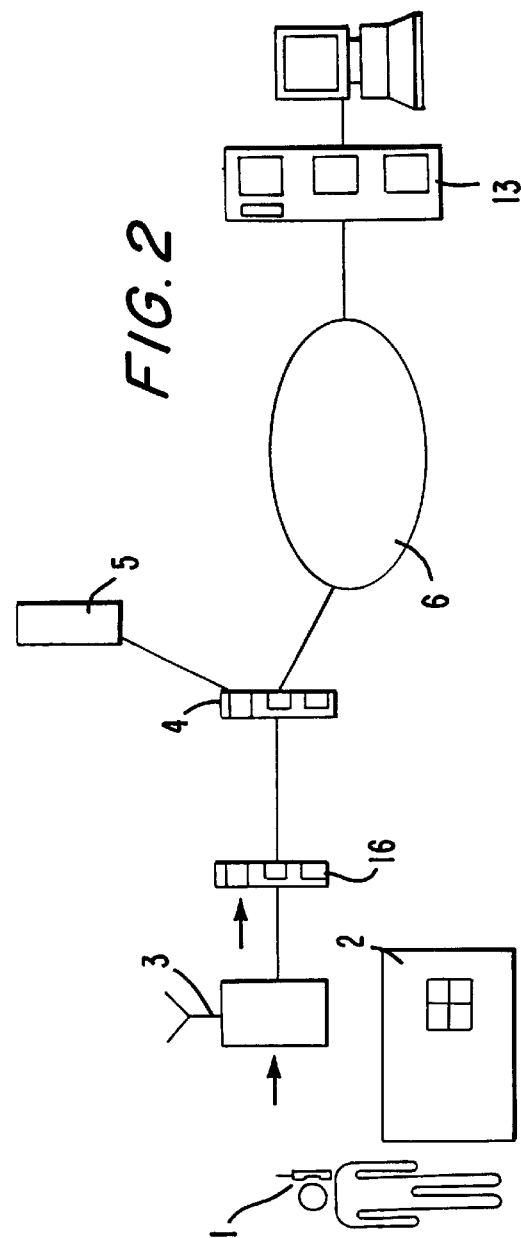

MOBILE TELEPHONE SYSTEM AND METHOD FOR CARRYING OUT FINANCIAL TRANSACTIONS USING A MOBILE TELEPHONE SYSTEM

FIELD OF THE INVENTION

The present invention is directed to a system and method for utilizing card operated mobile stations, especially utilizing a service card of a GSM-network SIM-card containing a SIM-unit, advantageously with different electronic service systems demanding a high degree of data protection.

BACKGROUND OF THE INVENTION

In present card systems the telecommunication networks are utilized in either on-line or off-line communication of transactions. Considerable problems are presented by the development and maintenance costs of the card systems and the telecommunication fixed costs, as well as the variable costs of communication for the service providers, e.g. shops and banks, etc. In present card systems the telecommunication traffic and subscriber fees are paid by the service providers (the shop, restaurant, taxi, hotel, etc.), because the division of telecommunication costs would otherwise demand the construction of expensive or, for use of customers, clumsy solutions.

A vital problem is the prevention of unlawful and criminal use of electronic service systems. Such situations occur when the card falls into the wrong hands or when the card is used for unauthorized services (i.e. the card lacks coverage or the card limit has been overdrawn). A considerable challenge lies in preventing forgery of service cards and electronic service sessions. The problem is, for example, the forgery of the user A-number identification in the public network service applications, where the A-number is used to check the user's access rights to the service, by which a forged A-number identification enables criminal use of the service in question.

A considerable problem also arises from the management of access right to different services associated with the same service card. At present, expensive technical arrangements are separately provided for every service provider in order to administer the different services associated with the card.

Another problem of present card systems is the transfer of transaction data in connection with a card transaction to the different parties, e.g. in a trade situation the transfer of the purchase and card payment information to the central system of the shop from a single site, to the payer's bank, to the payee's bank, etc. Different banks and credit companies have their own security systems.

The existing telephone banks (or telebanks) with different numbers provide voice-frequency telephones for the payment of bills and statement of account inquiries. When, e.g., a telebank is called, the computer identifying the DTMF-voice frequency signals available through the telephone network, i.e. the central voice applications platform (the CVAP), answers and the caller communicates with the CVAP by pushing certain keys suggested by a predetermined program.

By linking a card reader system to the phone, calls can be paid by credit card. U.S. Pat. No. 5,144,649 describes a method of using a radio telephone with a credit card. The phone can be used only by first presenting the credit card. The credit card data is read from the credit card and the local validity of the credit card is established by processing the credit card data. If the validity is approved, the phone can be used. When the client uses the phone to place or receive a call, the time for using the phone is recorded. The validity can be checked during the call, and if the call charge exceeds the credit limit, the method can cut off the call.

Published EP application 409 417 also describes the charging of calls when using a certain service data terminal having a credit card reader. In the credit card phone method, a local database, a storage and a programming intelligence have been connected to the telephone to enable the processing of calls. In that method, the user enters the credit card number after having dialed the required number, the data is locally recorded after having checked the authenticity of the card, and if the authorization succeeds, the call set-up continues. The line is supervised during the call. The card number, the dialed number, the date, time and call time are locally recorded, and the host computer is updated with this information. In the methods described above, only calls are charged to the credit cards.

SUMMARY OF THE INVENTION

The system and method according to the subject invention provide a preferable solution to the above mentioned problems. The invention is characterized in what is presented in the claims. The solution according to the invention requires the initialization of the service card SIM-unit to always require the use of a PIN-code, the connection of service number applications demanding high data security from the GSM-network base station onwards through a private network all the way to the service provider (e.g. a bank credit system), searching with the user's A-number identification, in the service application from the service database, the database required by the user and to which the user has a predetermined right according to the database register, the description of the A-number identification related services to the service database in which, e.g., the customer's account number corresponds to the A- and B-number identifications and, furthermore, for the service management a service center for the control of access rights to the A- and B-number related services and re-connection of the services.

Important advantages of the subject invention are the possibilities of utilizing the Pan-European GSM-system SIM-card or a card of a corresponding system in and for the different card issuers' applications, the possibilities of reducing and dividing the service and equipment related telecommunication costs due, for example, to joint usage of different service providers. The invention solves the problem of reliably utilizing a GSM-network user's local authentication all the way to the service provider. The invention also provides a solution to the charging of card system telecommunication transaction costs direct from the user or from a third party, which is a direct benefit for the service supplier of the use of the GSM-network and the SIM-unit in the card system. The invention has additionally resolved the problem of substantially obstructing unlawful and criminal use of telecommunication services and, furthermore, the safe processing of the A-number identification in service applications.

Payment transactions can be secured on-line, by which the use of stolen and forged cards can be immediately prevented when the computer in question has been informed. The transaction data is simultaneously transferred to the payer and the buyer. The same data terminal equipment can also be used as a mobile phone by installing a mobile communication network service card. Payments can thus take place throughout the whole network.

Different services can be associated with the GSM-card customer number defined in the SIM-unit (Subscriber Identification Module). The telecommunication costs related to the use of the services can be charged directly to the customer defined or identified by the card. The card related services are described either in the network in the customer's service database, i.e. the AUP (A-user profile) from which the data is searched with the caller's ANI (A-number identity), or in the service card containing the SIM-unit.

Due to the authentication taking place in the local or the mobile telephone network, the GSM-card is adapted for different transactions demanding high data security and which require authentication of the user. The most important applications are, by way of example, in banking service cards, such as credit and cash cards, insurance cards, regular customer cards, hotel cards, passenger traffic cards, etc.

The invention provides a solution to a reliable utilization of local authentication of a user of a GSM- or corresponding network in different service applications (e.g. accounts in two different banks). The invention provides a solution to the safe management of different services associated with the same service card and/or A-number identification.

By the term network is meant a combination of transmission routes and nodes between two or several users of the telephone or data communication connections.

The invention is presented below in more detail with reference to the enclosed drawings.

BRIEF DESCRIPTION OF THE DRAWINGS

In the drawings:

FIG. 1 is a diagrammatic representation of a prior art system for paying bills;

FIG. 2 is a diagrammatic representation of a simplified system in accordance with the present invention.

DETAILED DESCRIPTION OF THE PREFERRED EMBODIMENTS

Figure 3:
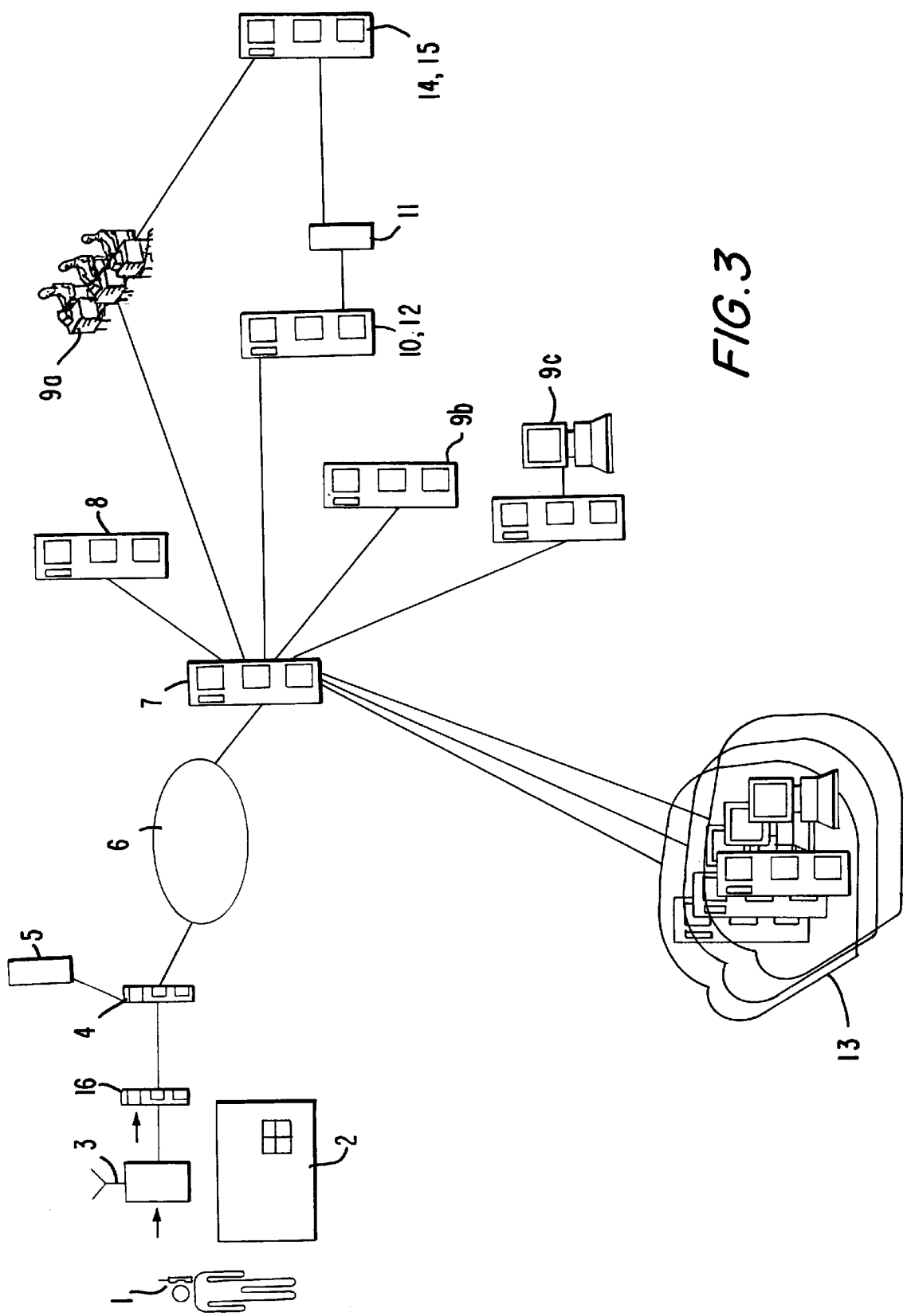
FIG. 3 is a more detailed diagrammatic representation of the inventive system showing the various connections to service providers between the data terminal equipment and the central or host computer system.

FIG. 1 depicts a known system for paying bills or inquiring as to account information by phone. No A-number identification authentication takes place. The telephone connection goes via the public telephone network 17, which does not enable a reliable A-number identification authentication in the application. The PIN-code application 18 is required to secure the customer identification in the application. The phone can in principle be used by anyone. The A-number identification cannot reliably be used in applications, e.g. payments, demanding high data security to identify the user if the connection is permitted without the use of the PIN-code of the service card 2, as in such a case anyone could unlawfully use the service. The application 18 must be installed to ask for the user code and password.

FIG. 2 depicts a mobile telephone system constructed in accordance with the invention, in which the audio- and/or data connection is directed from the terminal equipment 1 to the network 13 of the desired service provider. The service cards's SIM-unit has been initialized to always demand a four-number, for example, PIN-code before setting up the connection. In applications demanding high data security the connection from the mobile telephone exchange 4 to the application 13 is coupled via the dedicated network 6, and the caller's A-number identification, which is used to administer the user's rights and to connect the user to the service, is communicated to the application 13. With the intelligence part of the service card 2 installed in the terminal equipment of the system, the user of the equipment is locally authenticated at user authentication center or point 5, and the connection is directed via the dedicated network 6 to the service provider 13; with the help of the A-number identifier the service provider 13 identifies the rights of the service user to use of the services.

The system of FIG. 2 includes a terminal equipment 1 which is connected via the telephone network 6 with the service provider's central computer 13 containing the payment system. An object of the invention is to provide a payment system, including a mobile telephone network's terminal equipment 1, to which can be connected the subscriber identification unit 2 containing data for subscriber identification and radio traffic secrecy and which is readable by the terminal equipment for the use of card-operated mobile stations, e.g. a SIM-card in a GSM-system. The mobile stations 1 are connected or linked to the mobile network transmitter-receiver station, i.e. the base station 3. The base station controller 16 controls the operations of one or several base stations 3. From the controller 16 or base station 3 there are connections with the mobile telephone exchange, from which there are connections to the telecommunications network 6. According to the invention, calls to a predetermined number are directed to the dedicated network 6 by the mobile telephone exchange. In the call set-up, the subscriber is identified in the authentication center 5 and the subscriber is given the right to the call. The authentication center contains, for example in a GSM-system, the mobile subscribers' secret identification keys and this is utilized, for example, in securing data protection to prevent misuse of mobile subscriptions and to maintain radio traffic secrecy. The network can be a public telephone network, as is well known, but according to the invention in applications demanding high data security may be a dedicated network 6. Information about, e.g., the amount to be paid as well as the data required to identify the A- and B-subscriber identifications are transferred in the phone calls.

To build up or establish the connections, and with reference now to FIG. 3, the inventive system further includes a service connecting point 7 to which is linked a service control point 8 containing data about the services available to the subscriber. The control and management devices are essential for providing access to the services of the service providers, e.g. in audio-applications a person-aided service 9a—such as a call-management program intended for operator use in a CallCoordinator 2 operating in a local area network PC- or minicomputer environment, or an automated telephone service system 9b such as a Periphonics VPS or IBM DirectTalk/6000 or some other micro- or minicomputer based system intended for voice progressing—and in data applications a telematic service system 9c with connections, via the service connection point 7, to the services of the service provider.

In voice-applications the telephone service system includes a PABX 10 such as a Meridian System, a data adapter 11 linked to the PABX, such as by a Meridian Link for switching of the A- and B-numbers to the talk- and data sessions, an automated talk control system 12 such as a Meridian ACD System, a possible PABX network 13 such as a Meridian System, a host computer 14 such as a host-machine IBM or Tandem, and a service application 15 to be run in the host computer 14.

The data terminal equipment 1 can be located, by way of example, at a store paydesk, where the customer puts his own pay (service) card 2 in the terminal, i.e. the GSM-telephone's card reading device. In the inventive method the charging of transactions of the card holder is based on the SIM-card and the GSM-network standard, according to which the SIM-card in the GSM-terminal card reader reserves the equipment based on the SIM-card user data. The GSM-terminal is visible to the network-operator as a personal transaction of the card holder. The payer enters his card identification number into the terminal. After having approved the identification number entered by the payer, the GSM-network terminal is switched to the GSM-network, if permitted by the system. The payer selects the transmitter of the transaction, for example a bank or credit company, on the basis of which a call is placed to the transmitter's payment system. When the connection is set up via the dedicated network 6, the system of the transmitter's payment system requests the amount to be paid and that the payer confirm the amount. After then having approved the transaction, the payment system returns an identification number. The payment terminal utilizing the GSM-network produces to the customer a receipt for the transaction and records the transaction in the cash register.

In the inventive system, the same call effects a connection with the payment system of the payee for simultaneous securing of the usability of the card, and a connection with the network operator to charge for use of the phone.

The inventive system also enables the offering of free services via the network, because the payer of every transaction in the GSM-connection can be uniquely defined or identified so that the payee or another party is charged when utilizing, in the GSM-network, the payee's free service number or a collect call or the like.

Generally, a computer system is built around the GSM-terminal, which system contains the local database, storage and programming intelligence providing the peripheral devices required for invoicing and cash registering. The identification of the card issuer, i.e. the service provider such as a store, bank, etc., can be made in the SIM-card blank. The SIM-card may, if required, be embossed and furnished with a magnetic stripe. The SIM-card or a corresponding micro-chip can be programmed and altered so that when the card is put into the data terminal equipment it automatically calls the transaction processing system of the service provider, as for example the central payment transmission system.

Due to the high data security demanded in banking and payment applications, the banking and payment application connections initiated or requested in the GSM-network are effected through the mobile telephone exchange MSC 4 and the dedicated network 6 which may, for example, consist of a plurality (N) of 2-Mbps channels or links or connections. The use of the dedicated network 6 is intended to prevent unlawful use of the services, which is at present possible when the public telephone network is employed.

To access banking services, a bank customer places the bank service card containing the SIM-unit in the GSM-network terminal. In telephone-based banking services the terminal may be a standard GSM telephone. In databased banking services the terminal may be a microcomputer and a banking service program linked to the GSM-telephone; thus, a sufficient storage and programming intelligence for data processing and transmission is either contained in the data terminal itself or linked thereto, as is well known. The terminal, as for example a Motorola MicroTac-phone serial port, may accordingly be linked to a microcomputer (data processing device) and/or a display, a keyboard and means to control these devices.

Banking services are handled by calling the bank related service numbers, i.e. the B-number, based on which customer information—as, for example, the customer's service or user profile AUP, the customer's account number(s) and information about available banking services—is searched for and retrieved from the service database linked to the customer's A-number. From the accounts linked to the customer's AUP, monies or funds can be transferred to other accounts, bills can be paid, or bills contained in the bill basket linked to the AUP can be approved or rejected. The bill basket is a system to which the invoicing parties deliver their invoicing material and from which a payer can approve or refuse payments addressed to that payer.

In a banking service application the customer feeds his card into a device contained in the GSM-network terminal, and enters his PIN-code. The GSM-network terminal carries out a local PIN-code check in accordance with the GSM-standard. If the PIN-code is correct, the customer can then get in connection with the bank. In the event that the PIN-code is incorrect the customer can try again for a limited number of times in accordance with the GSM-network's SIM-standard. The SIM-unit has been initialized for banking and payment applications in a state that always demands entry of the user's PIN-code. When the number of consecutive PIN-code entries or attempts permitted by the system has been exceeded, the card is locked and its re-opening requires a so-called PUG-code which is longer than the PIN-code. In any event, when the PIN-code entry is correct, the customer selects the banking service number. Based on the customer's A-number, the services available to the customer are searched and determined from the customer database. The customer attends to his banking affairs by phone or by home computer and thereafter cuts off the connection.

When paying by pay card, the payer's card is fed into the payment data terminal and the shopkeeper (cashier) enters the code of the payment transmitter (i.e. the bank, credit company, etc.) selected by the payer and the amount to be paid. The payer enters his PIN-code. As described above, checking of the PIN-code is carried out whereafter, based on the customer's A-number, the account (bank account or credit account or the like) to be charged is searched in the database maintained by the teleoperator or the payment transmitter. After having approved the transaction, the payment system sends to the seller a consecutive approval number for registration of the transaction and for producing a receipt.

The amount paid in the approved transaction is credited to the shopkeeper's account. When the payer's account contains insufficient funds to cover the payment, or if the transaction for some other reason cannot be approved, the payment system sends a rejection message.

The payment data terminal includes, by way of example, a display, a keyboard, a receipt printer, an optional link to the casher system, a reader, etc., as well as the above-mentioned SIM-card reader and the GSM-network terminal equipment.

A Mega Service Center operates as the service card system maintenance center, in which different service providers' services related to the service cards and/or A-number identifications are administered, and in which customers can, with the help of their A-number identification, change their service profiles (AUP) and easily and safely handle different transactions. The Mega Service Center may be a person-aided system 9a or an automated telephone system 9b or a telematic system 9c (i.e. a computer supported data service system), from which the customer's telecommunication connection is transmitted or connected to the services available to the customer.

The invention has been described hereinabove with reference to its preferred forms of implementation. The invention is not, however, to be considered as so limited, and all modifications within the scope of the inventive concepts defined by the following claims are of course included.

What is claimed is:

1. A method for using telecommunications services to carry out financial transactions by a mobile telephone system comprising a mobile telephone exchange for coupling connections;

a data terminal equipment (1) comprising a service card (2) which contains an intellegence part;

a desired service provider (13); and an authentication center (5), the method comprising of requesting entry of a personal identity code of a user;

accepting entry of the personal identity code of the user to the data terminal equipment (1);

verifying validity of the personal identity code;

establishing a connection between the mobile telephone exchange and the data terminal equipment (1);

in response to the valid personal identity code:

authenticating the user of the mobile telephone system in the authentication center (5) by means of the personal identity code and data from the intelligence part of the service card by performing the steps of:

authenticating the user locally in te authentication center (5) to verify his rights to use the service of the desired service provider (13);

connecting the user to the desired service provider (13) via dedicated network (6), whereby the connection between the data terminal equipment (1) and the desired service provider (13) is a secure connection.

2. A method according to claim 1, wherein the mobile telephone system is a Global System for Mobil Communication (GSM)-type mobile telephone system with service-card-controlled mobile teminals, and wherein the service card contains a Subscriber Identity Module (SIM) unit for the GSM-type network, which has in authentication applications been initialized to demand entry of the user's identification by Personal Identity Number (PIN) associated with the service card.

3. A method according to claim 2, wherein in applications deemed to required high data security, the connections established in the GSM-type-network are transmitted from the mobile telephone exchange (4) to the dedicated network (6), thereby preventing misuse.

4. A method according to claim 1, 2 or 3 wherein in the said connections established from the mobile telephone exchange (4) via the dedicated network (6) to the service provider (13), after the said local user authentication a subscription number associated with the the calling subscription (A-number) identity is utilized to check the user's rights to use the service.

5. A method according to claim 1, 2, 3 or 4, wherein in the mobile telephone exchange a call to a predetermined number is transmitted to the dedicated network (6) according to a register contained in the mobile telephone exchange.

6. A method according to claim 1, 2, 3, 4 or 5, wherein from a private network there is provided a connection via a service switching point and a service control point to predetermined user services according to registration in a service database administered by an operator to connect user to desired services.

7. A method of making payment by a terminal equipment of a mobile telephone exchange of a global System for Mobile Communication (GSM) type mobile telephone network, the said terminal equiment having a SIM card associated with it enabling user's calls, the method comprising the steps of:

establishing a connection from the terminal equipment to the mobile telephone network;

providing an access to service provider's services via said connection;

reading from the SIM card user-identifying data;

reserving the terminal equipment based on the user-identifing data;

entering a card identifying number into the terminal equipment, authenticating the user according to the user-identifying data and the card identifying number;

connecting the terminal equipment to the GSM network;

calling a service provider's payment system;

forming a connection with the service provider's payment system;

giving an amount to be paid, confirming the amount;

approving the payment;

assigning a payment identifying number and producing a receipt of the transaction in the service provider's terminal; and in the service provider's payment system, charging telephone connection time and cutting off connection.

8. A method according to claim 7, comprising:

checking the user's right of use in service providers terminal;

checking an amount to be paid by the card; and acknowledging to the user receipt of the payment.

9. A method according to claim 7, wherein a subscription of calling subscription (an A-number) identity corresponds to an account number.

* * * * *